United States Patent [19]
Ress, Jr.

[11] Patent Number: 5,660,526
[45] Date of Patent: Aug. 26, 1997

[54] GAS TURBINE ROTOR WITH REMOTE SUPPORT RINGS

[75] Inventor: Robert Anthony Ress, Jr., Carmel, Ind.

[73] Assignee: Allison Engine Company, Inc., Indianapolis, Ind.

[21] Appl. No.: 461,122

[22] Filed: Jun. 5, 1995

[51] Int. Cl.$^6$ .................................................. F01D 5/06
[52] U.S. Cl. .................. 416/198 A; 416/218; 416/244 A
[58] Field of Search ......................... 416/198 A, 201 R, 416/244 A, 218; 415/173.7, 199.5

[56] References Cited

U.S. PATENT DOCUMENTS

| | | | |
|---|---|---|---|
| 2,623,727 | 12/1952 | McLeod . | |
| 2,918,253 | 12/1959 | MacKay . | |
| 3,281,116 | 10/1966 | Keenan . | |
| 3,501,249 | 3/1970 | Scalzo et al. . | |
| 3,554,668 | 1/1971 | Wagle | 416/230 |
| 3,610,772 | 10/1971 | Wagle | 416/218 |
| 3,610,777 | 10/1971 | Wagle | 416/218 |
| 3,888,602 | 6/1975 | Nichols et al. | 416/198 A |
| 3,894,324 | 7/1975 | Holzapfel et al. . | |
| 4,844,694 | 7/1989 | Naudet . | |
| 5,174,720 | 12/1992 | Gradl . | |
| 5,197,857 | 3/1993 | Glynn et al. . | |
| 5,288,210 | 2/1994 | Albrecht et al. . | |

FOREIGN PATENT DOCUMENTS

| | | | |
|---|---|---|---|
| 903268 | 9/1945 | France | 416/198 A |
| 2027861 | 12/1971 | Germany | 416/218 |

Primary Examiner—James Larson
Attorney, Agent, or Firm—Woodard, Emhardt, Naughton, Moriarty & McNett

[57] ABSTRACT

A lightweight gas turbine rotor having a pair of high specific strength support ring members positioned fore and aft a center hub member. The unitary center hub member for carrying a plurality of airfoils that extend radially outward therefrom. The pair of high specific strength support ring members are connected to the blade carrying member at a location to compressively transmit the centrifugal force generated by the rotating rotor to a radially inward location on the support ring members. The support ring members being utilized to resist a majority of the centrifugal force generated by the components of the rotor. The center hub member and the pair of support ring members are made of different materials. More particularly the pair of support ring members are made of a metal matrix composite, and the center hub member when utilized in a compressor is formed of a high temperature titanium alloy, and the center hub member when utilized in a turbine is formed of a nickel alloy.

50 Claims, 6 Drawing Sheets

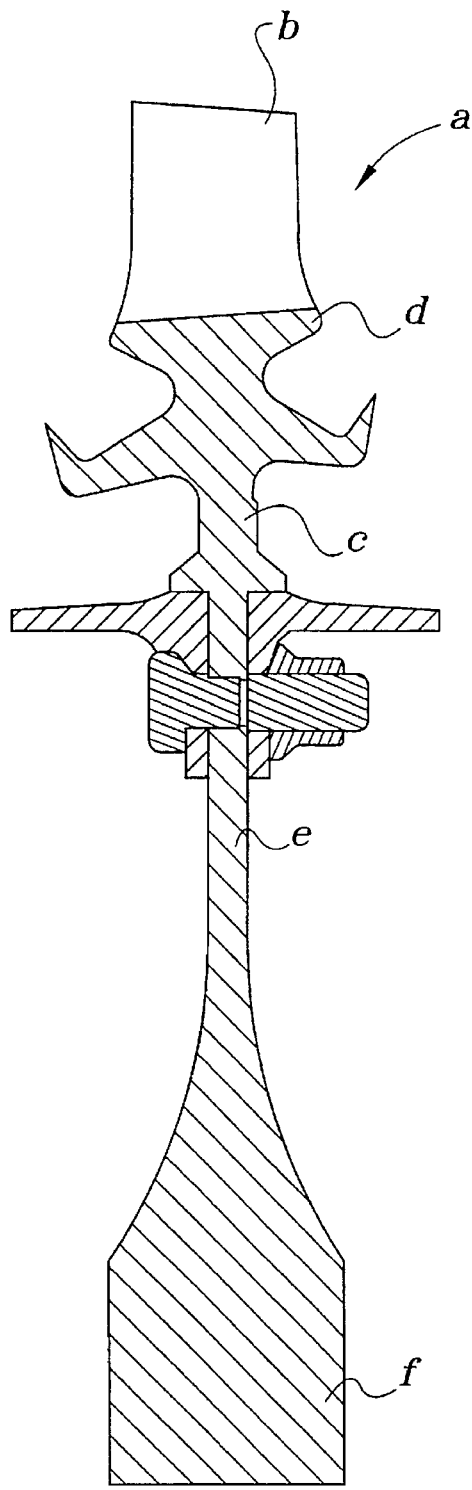
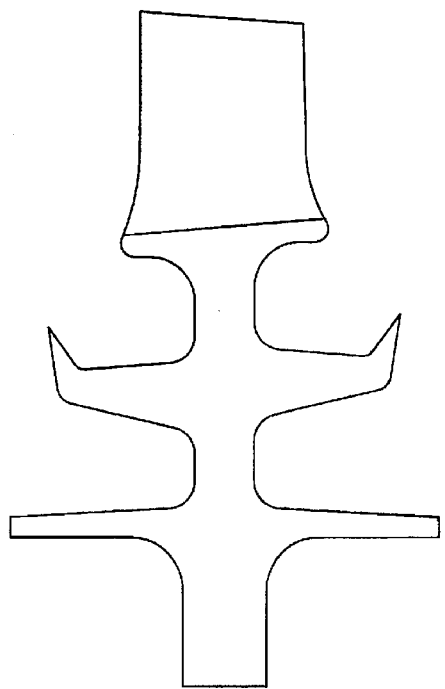
Fig. 2
(PRIOR ART)
Fig. 1
(PRIOR ART)

GAS TURBINE ROTOR WITH REMOTE SUPPORT RINGS

BACKGROUND OF THE INVENTION

The present invention relates generally to the design and construction of a bladed rotor disk for use in a gas turbine engine. More particularly, the present invention has one application wherein a pair of high specific strength remote support rings are utilized to support the blade carrying member of the rotor disk and resist a centrifugal load generated by the rotating components. Although the invention was developed for use in a gas turbine engine, certain applications may be outside of this field.

It is well known that a gas turbine engine integrates a compressor and a turbine having components that rotate at extremely high speeds. Typically, the rotating components within a gas turbine engine include a rotor disk having a plurality of circumferentially spaced blades which extend radially outward from the rotor disk. During operation of the gas turbine engine the rotor disk and blades are rotated, therefore a centrifugal force attendant with rotation acts on the components in a radial direction.

A conventional rotor disk includes an outer rim and an inner hub with a radially extending web therebetween. The outer rim has an axial width sufficient to ensure low stress therein when subjected to centrifugal loading or forces imposed by the rotating components. Generally, the radially extending web has an axial width smaller than that of the outer rim in order to minimize the weight of the rotor disk, and the axial width of the inner hub has about the same axial width as the outer rim in order to provide needed structural integrity for the rotor disk.

The rotor disk of a gas turbine engine typically has relatively high rotation energy related to the centrifugal force or load generated thereby during normal operation. It is well known that the rotational speed of the components in the gas turbine engine and the size of the rotor disk and blades impact the potential centrifugal load developed by the rotating assembly. Traditionally, designers of gas turbine engines have balanced many parameters in order to develop a rotor that meets product performance requirements, maintains an acceptable service life, and minimizes catastrophic failure during operation.

Conventional rotor disks are known to fail due to propagating cracks that can develop under relatively high centrifugal loads. Cracks typically form at stress concentrations in the disk such as, for example, undetected inclusions in the disk, or at stress risers such as holes in the disk. In one failure mode, cracks propagate circumferentially around the disk and may result in the rim separating from the web. In another failure mode, cracks propagate in a radial direction through the hub, web, and rim thereby radially splitting the disk and resulting in failure. Rotor disks operate in a hostile environment and must be designed to withstand the stresses created due to centrifugal loading.

With reference to FIG. 1, there is illustrated a prior art conventional rotor disk design for use in a gas turbine engine. Gas turbine engine rotor assembly 'a' includes a blade 'b' fastened, integrally or through mechanical attachment, to a supporting hub 'c'. The supporting hub 'c' comprising a thickened rim section 'd', a relatively thin web section 'e' and a thickened bore section 'f'. The thickened bore section 'f' functions to resist the centrifugal force generated by the rotating disk assembly 'a'. In the past decade much effort has been expended to increase the reliability, fuel efficiency and performance of gas turbine engines. Most recently designers of gas turbine engines have been working to reduce the weight of rotor assemblies through the incorporation of high specific strength support systems.

High specific strength support systems include organic matrix composites, metal matrix composites, and ceramic matrix composites. With reference to FIG. 2, there is illustrated a metal matrix composite blade ring (bling) that has been actively pursued by gas turbine engine designers. One limitation associated with a circumferentially reinforced metal matrix composite bling design is the transverse (radial) load capability at the outer diameter of the ring. Since a weak bond exists at the fiber/matrix interface, transverse tensile load cannot be transmitted across fibers and must be carried through the matrix only. A circumferentially reinforced metal matrix composite ring has superior load carrying characteristics when loaded at its base since the fibers can transmit compressive transverse load. Further limitations associated with the metal matrix composite bladed ring (bling) relate to it's manufacturability, maintainability, and acquisition cost projections.

Although the prior techniques of producing a reduced weight rotor disk are steps in the right direction, the need for additional improvement still remains. The present invention satisfies this need in a novel and unobvious way.

SUMMARY OF THE INVENTION

One embodiment of the present invention contemplates a rotor that is subjected to a centrifugal force upon rotation. The rotor comprising: an airfoil; a member for carrying the airfoil; a support ring connecting to the member for resisting the centrifugal force applied to the rotor; and the member made of a different material than the ring and connecting the airfoil to the ring at a location to compressively transmit the majority of the centrifugal force to a radially inward location on the ring.

One object of one form of the present invention is to provide an improved rotor for a gas turbine engine.

Related objects and advantages of the present invention will be apparent from the following description.

BRIEF DESCRIPTION OF THE DRAWINGS

FIG. 1 is a sectional side elevational view of a prior art rotor disk having a thickened bore section.

FIG. 2 is a sectional side elevational view of a rotor disk comprising a metal matrix bladed ring (bling).

DESCRIPTION OF THE PREFERRED EMBODIMENT

Figure 3:
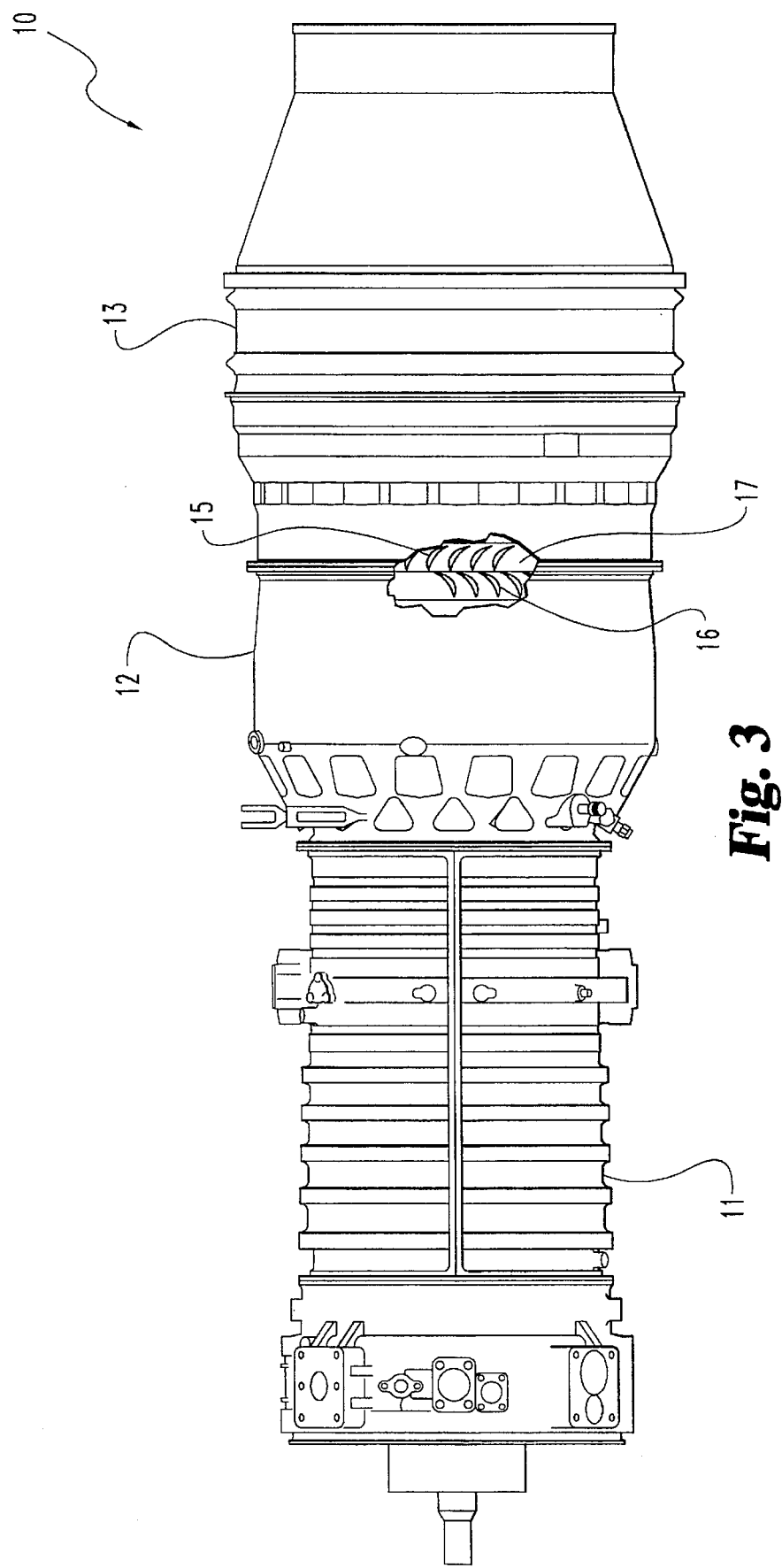
FIG. 3 is a partially fragmented sectional side elevational view of a gas turbine engine comprising a rotor disk of one form of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 3, there is illustrated a gas turbine engine 10 which includes a compressor 11, a combustor 12 and a turbine 13. The three components have been integrated together to produce an aircraft flight propulsion engine. It is important to realize that there are a multitude of ways in which the components can be linked together. Additional compressors and turbines can be added with intercoolers connecting between the compressor and reheat combustion chambers to be added between the turbines. Further, the gas turbine engine is equally suited to be used for industrial applications. Historically, there has been wide spread applications of industrial gas turbine engines, such as pumping sets for gas or oil transmission lines, electricity generation and naval propulsion.

A rotor assembly, positioned within the gas turbine engine 10, includes a turbine rotor disk 17 connecting to a shaft which is rotatably mounted to the engine. The rotor disk 17 has a plurality of circumferentially spaced turbine blades 15 attached thereto. A plurality of turbine vanes 16 forms a portion of a nozzle within the gas turbine engine 10. It is generally well known to persons skilled in the art that a rotor disk with circumferentially spaced blades is also utilized within the compressor portion 11 of the gas turbine engine 10. The term airfoil will be used herein interchangeable with the term blade.

Figure 4:
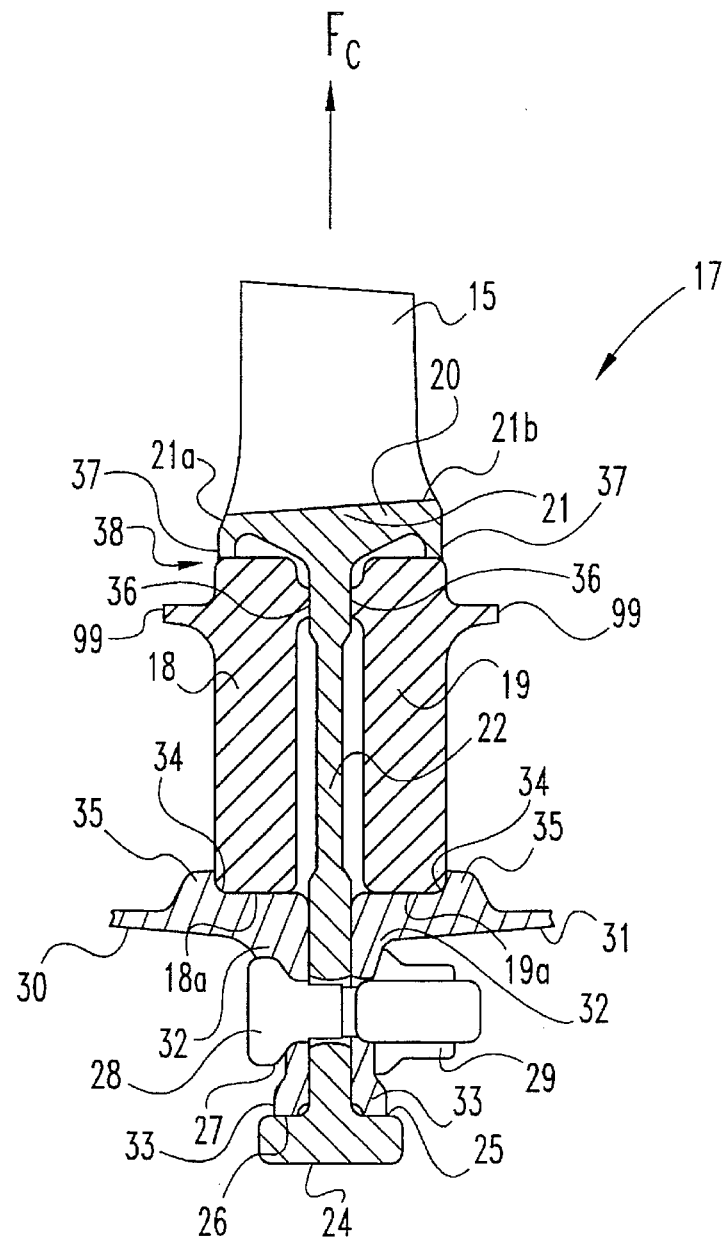
FIG. 4 is a sectional side elevational view of the rotor disk assembly with support ring members according to one form of the present invention.

With reference to FIG. 4, there is illustrated a sectional view of the rotor disk 17. It is understood that the rotor disk 17 is symmetrical about an axial centerline x of the gas turbine engine 10. In the preferred embodiment the rotor disk 17 includes a center hub member 20 that is connected to a pair of annular support ring members 18 and 19 which are positioned adjacent the center hub member 20. Support ring members 18 and 19 are located fore and aft the center hub member 20, and the center hub member 20 is positioned substantially central between the support ring members.

The center hub member 20 consists of: a rim portion 21 that is thickened in the axial direction; a radially inward base portion 24; and a relatively thin substantially imperforate webbed portion 22 extending radially therebetween. In the preferred embodiment the axial width of the rim portion 21 is about at least as large as the axial width of the turbine blade 15. In one form of the present invention the webbed portion 22 has an axial width that is about ⅕ of the axial width of the rim portion 21. In the preferred embodiment a plurality of airfoils 15 are integrally connected to the rim portion 21, however, in an alternative embodiment the airfoils 15 are mechanically attached to the rim portion 21. The plurality of airfoils 15 extend radially outward from the rim portion 21 of the center hub member 20, and are carried by the center hub member 20.

In the preferred embodiment the center hub member 20 is a unitary annular disk that includes the rim portion 21, web portion 22 and a base portion 24. It is preferred that the center hub member for a compressor would be a machined forging, and that the center hub member for a turbine would be cast. It is understood that the center hub member can be formed as an integral component from a plurality of subcomponents. Preferably the center hub member 20 when utilized in a compressor is formed of a high temperature titanium alloy, and that the center hub member 20 when utilized in a turbine is formed of a powdered nickel super alloy. It is contemplated that the center hub member 20 can be formed of other materials having similar properties to the materials recited herein.

The base portion 24 of center hub member 20 includes a pair of annular flanges 25 and 26 that are formed substantially parallel to the axial centerline x and that extend axially from the center hub member 20. In the preferred embodiment the base portion has an axial width less than the axial width of said rim portion, however base portions having other axially widths are contemplated. The flanges 25 and 26 function to compressively transmit the centrifugal load from the center hub member 20, through a pair of interstage spacers 30 and 31 and into the bases 18a and 19a of the support ring members 18 and 19. At least a portion of the drive hubs/interstage spacers 30 and 31 contact the flanges 25 and 26. The web portion 22 includes a plurality of circumferentially spaced apertures 27 which are designed to receive a fastener therethrough. In the preferred embodiment the fasteners 28 defines a threaded bolt 28 and nut 29 combination. The plurality of interengaging bolts 28 and nuts 29 attach the drive hubs/interstage spacers 30 and 31 to the center hub member 20.

The pair of drive hubs/interstage spacers 30 and 31 include a 'L' shaped annular body member portion 32 which is positioned adjacent the center hub member 20. In the preferred embodiment the drive hubs/interstage spacers 30 and 31 are located fore and aft the center hub member 20 respectively. The drive hub/interstage spacers 30 and 31 that are positioned within the compressor are formed of a high temperature titanium alloy and the drive hub/interstage spacers that are positioned within a turbine are formed of a powdered nickel super alloy. It is understood that the hubs/interstage spacers 30 and 31 can be formed of other materials having similar properties to the materials recited herein. An annular ring portion 33 of each drive hub/interstage spacer 30 and 31 contacts the flanges 25 and 26 of the base portion 24 of center hub member 20. An annular flange portion 34 of drive hub/interstage spacers 30 and 31 receives the support ring members 18 and 19 thereon. Flange portion 34 being oriented substantially parallel to the axial centerline x of the gas turbine engine 10.

In the preferred embodiment the drive hubs/interstage spacers 30 and 31 include an integrally formed upstanding circumferential shoulder 35 for preventing the axial movement of the support ring members 18 and 19 thereon. A static clamping load is transmitted from the plurality of bolt and nut combinations to the drive hub/interstage spacers 30 and 31 to hold the support ring members 18 and 19 in place.

In the preferred embodiment the support ring members 18 and 19 are made of a different material than the center hub member 20, and include an integrally formed axially extending circumferential locating flat portion 36 that abuts the web portion 22. The circumferential locating flat portion 36 being for spacing the support ring members 18 and 19 an axial distance from the center hub member 20. An annular seal land 99 is formed on each of the support ring members 18 and 19, and the land 99 extends axially away from the center hub member 20. Further, a pair of circumferential drop rails 37 are located at the axial ends 21a and 21b of the rim portion 21. The drop rails 37 extend radially inward toward the remote support ring members 18 and 19 to minimize instage cavity recirculation losses by creating a small rim cavity 38 between the disk rim and the adjacent structure (not illustrated) in the rotor disk 17. In the preferred embodiment there is a clearance between the drop rails 37 and the top of the support ring members 18 and 19.

In the preferred embodiment the rotor disk 17 is designed and constructed so that the support ring members 18 and 19 are connected to the center hub member 20 in order to resist a centrifugal force (Fc) generated by the rotating assembly. The components comprising the rotor disk 17 when rotated create centrifugal forces that are resisted by the support ring members 18 and 19. A majority of the centrifugal force Fc is compressively transmitted from the flanges 25 and 26 of the center hub member 20 through the drive hub/interstage spacers 30 and 31 to a radially inward location on the support ring members 18 and 19. In the preferred embodiment the centrifugal force is transmitted to the radial inward side of said support ring members 18 and 19, and more specifically to their bases 18a and 19a. By transferring the radial load so as to act on the base of the support ring members 18 and 19, the ring members are subjected to a compressive load which creates a compressive stress, rather than a tensile stress. In the preferred embodiment the support ring members 18 and 19 share the centrifugal force transmitted from the center hub member 20. In a more preferred embodiment the support ring members 18 and 19 each resist about one half of the centrifugal force Fc transferred from center hub member 20.

The assembly of the rotor disk 17 would involve first positioning each of the support ring members 18 and 19 on the respective annular flange portions 34 of the hub/interstage spacers 30 and 31. These subassemblies are then placed adjacent the center hub member 20 such that the flat portion 36 of the support ring members contacts the web portion 22. The plurality of bolts 28 are inserted through apertures 27 and the nuts 29 are then torqued.

Figure 5:
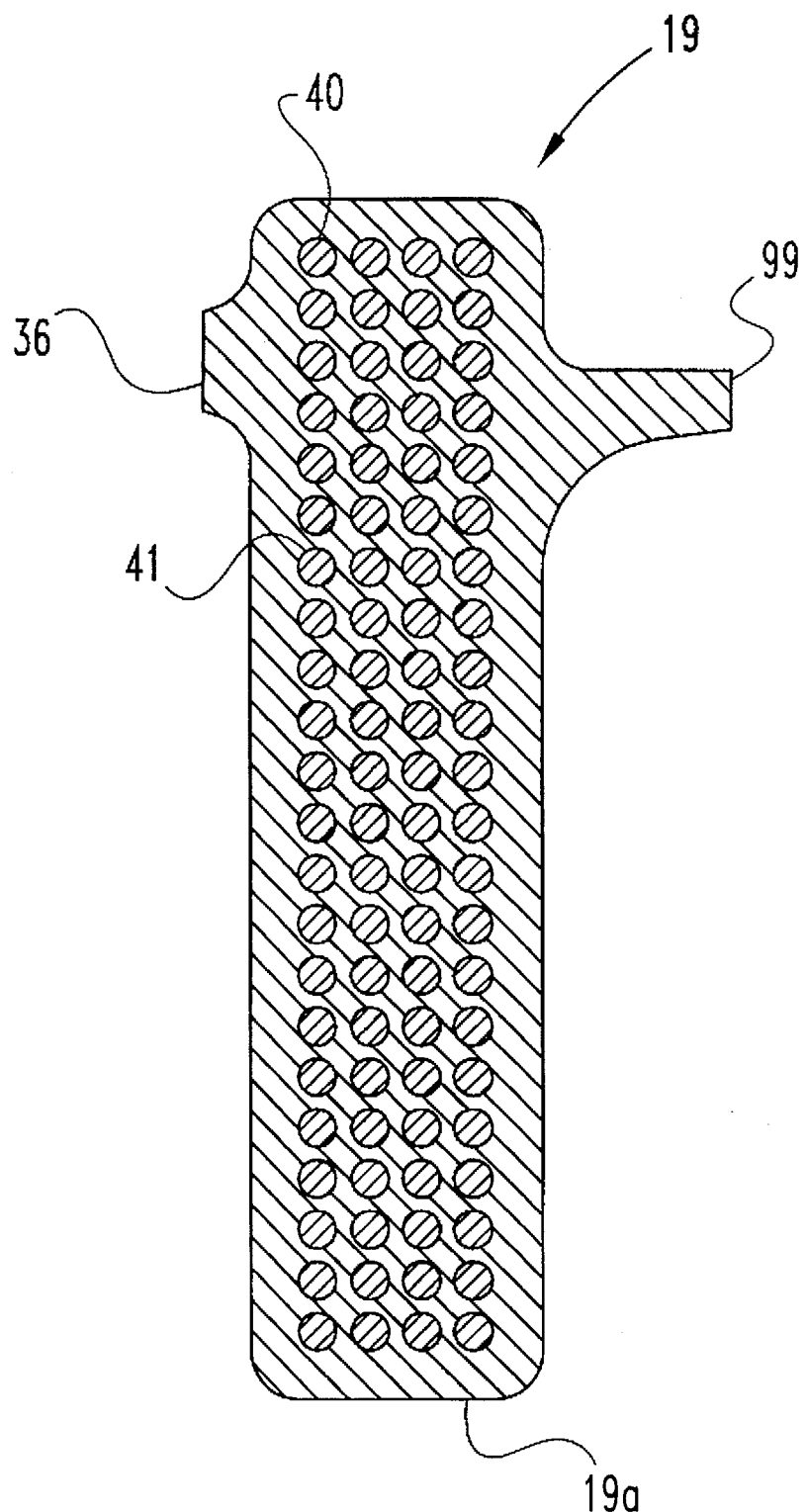
FIG. 5 is a illustrative sectional view of one of the support ring members which comprises a portion of the FIG. 4 rotor disk.

With reference to FIG. 5, there is an illustrative sectional view of the preferred embodiment of one of the support ring members. In a preferred embodiment the support ring members are made of a composite material, and more specifically a high specific strength material system. In a more preferred embodiment the support ring members are of a high specific strength metal matrix composite (MMC), which comprises a plurality of fibers 40 extending circumferentially around the support ring member. It is understood that the quantity, size and spacing of the fibers 41 shown herein, is merely illustrative and is not a limitation as to the spacing, quantity or fiber size. The plurality of circumferentially extending fibers 40 are spaced from one another in both an axial and radial direction. In a most preferred embodiment the fibers 40 are of a silicon carbide composition, and the plurality of fibers 40 are held together by a titanium alloy 41. Further the titanium alloy 41 forms an exterior covering for the matrix of silicon carbide fibers 40 and titanium alloy 41 which comprises the support ring members 18 and 19.

The support ring members 18 and 19 are manufactured by laying up a network of circumferentially extending silicone carbide fibers 40, which are separated by a titanium alloy foil. The network of silicon carbide fibers 40 and titanium alloy foil is then hot isostatically pressed to produce one form of the the support ring structure of the present invention. A metal matrix composite support ring member has properties that make it extremely resistant to compressive loads and their attendant compressive stress. It is understood that the process of making a metal matrix composite part is generally well known to those skilled in the art. Further, in alternate forms of the present invention the support ring members are constructed of other high specific strength material systems including organic matrix composites and ceramic matrix composites.

Figure 6:
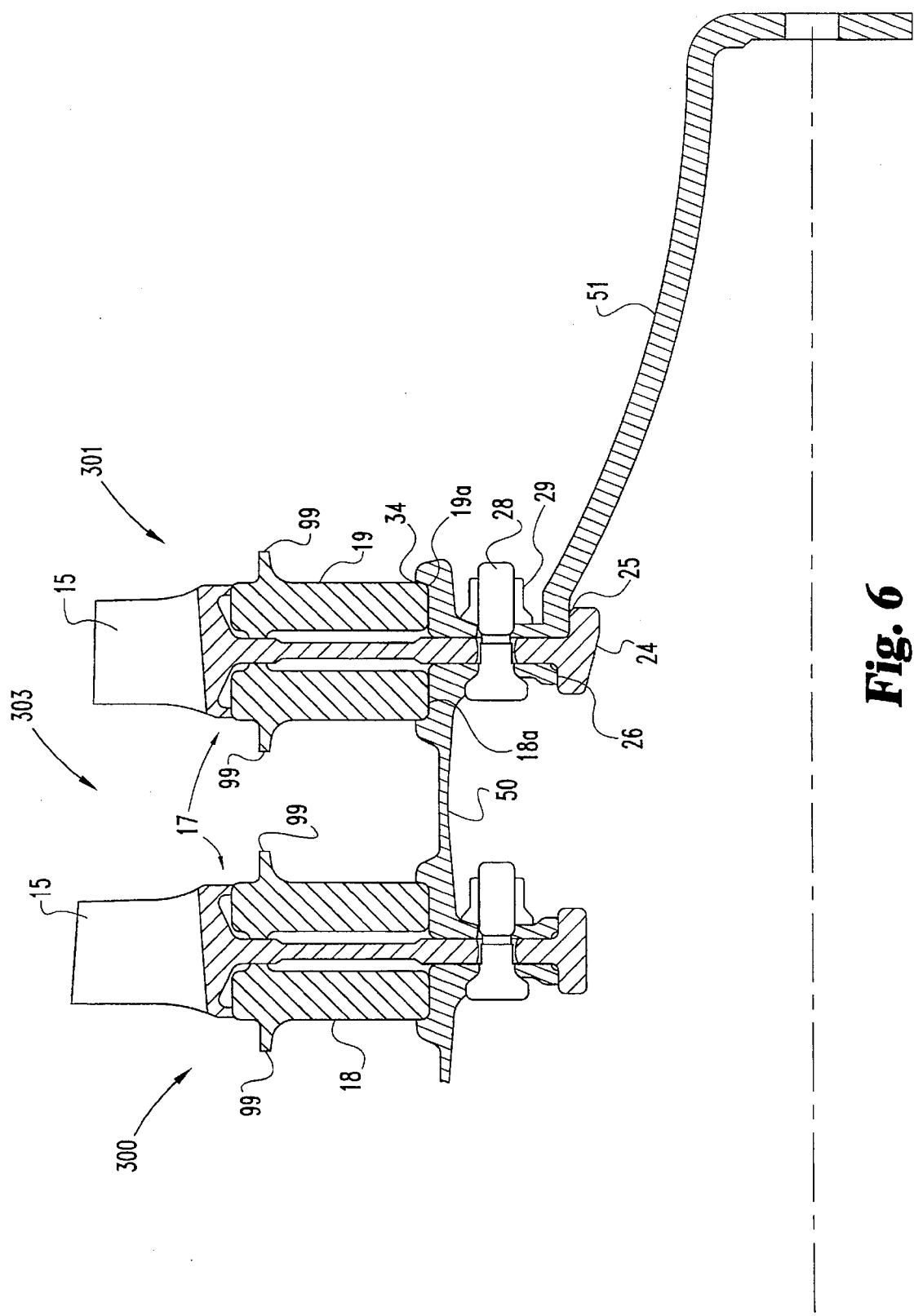
FIG. 6 is an illustrative side elevational view of a pair of FIG. 4 rotor disks with support ring members that have been integrated into a multi-stage rotor assembly.

With reference to FIG. 6, there is illustrated two stages 300 and 301 of a multi-stage rotor assembly 303 incorporating a pair of rotor disks 17 having support ring members 18 and 19 connected thereto. Further, in an alternate embodiment each stage of the rotor assembly 303 includes support ring members made from one of the high specific strength material systems. The ability to incorporate rotor disks having support ring members constructed of different high specific strength material systems allows for the selection of the optimum material for each stage of the rotor assembly.

Drive hub/interstage spacer 50 functions substantially similar to drive hub/interstage spacer 31, and also functions to connect the rotor disk 17 of the first stage 300 to the rotor disk 17 of the second stage 301. It is contemplated that multiple drive hubs/interstage spacers 50 could be utilized for connecting multiple rotors together. The second stage 301 includes a substantially conical drive hub 51 that connects one end of the rotor assembly 303 to the rotating shaft in the gas turbine engine 10. It is understood that the conical drive hub 51 analogously can be connected to rotors having any number of stages, and that there is a corresponding connection at the opposite other end of the rotor assembly to provide attachment at each end of the assembly. The drive hubs/interstage spacers being connected to the center hub member 20 by a bolted connection.

Figure 7:
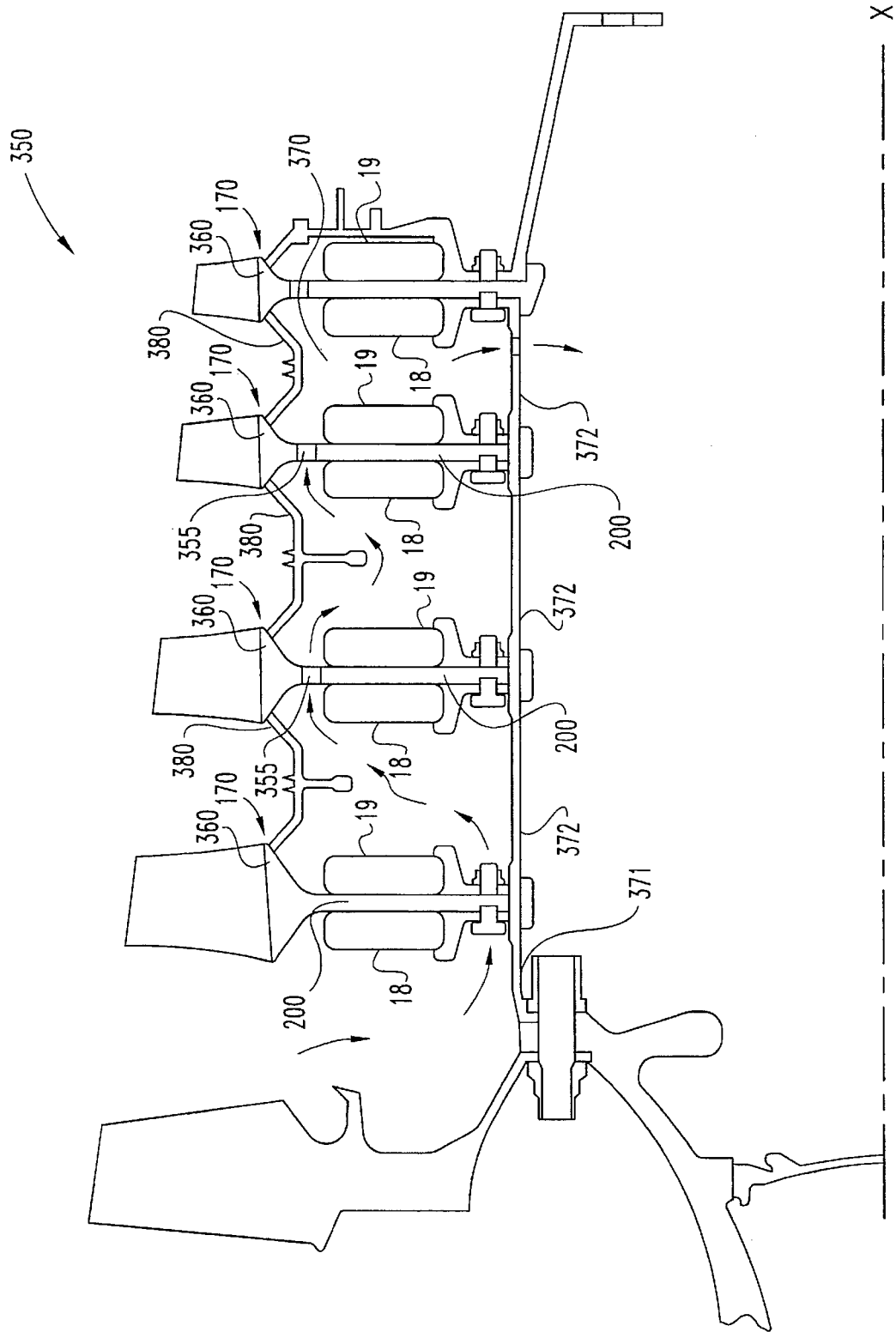
FIG. 7 is an illustrative sectional side elevational view of another form of the rotor disk with support ring members of the present invention which includes a cooling circuit to enable the rotors to operate at a higher temperature.

With reference to FIG. 7, there is illustrated a multi-stage rotor assembly 350 incorporating a plurality of rotor disks 170 with support ring members 18 and 19. Rotor disk 170 and support ring members 18 and 19 are substantially identical to rotor disk 17 and support ring members 18 and 19. This form of the present invention is designed and manufactured to allow fluid cooling of the rotor assembly to enable operation at relatively higher temperatures. A plurality of cooling apertures 355 are formed circumferentially around each of the center hub members 200 to allow the passage of cooling fluid therethrough.

In the preferred embodiment the cooling fluid is air that has been extracted from the working fluid of the compressor. In this form of the present invention the rim portion 360 of the center hub member 20 does not utilize a pair of drop rails 37 to minimize recirculation losses. Further, the rotor assembly 350 forms a double backbone construction which provides an annular fluid flow channel 370 for the passage of cooling air therethrough. The annular fluid flow channel 370 extending axially through the assembly and the channel is substantially parallel to the axial centerline x of the gas turbine engine. The double backbone annular channel 370 is formed by the combination of drive hub/interstage spacers 371 and 372, the rim sections 360 of the center hub members, and labyrinth seals 380. The rotor disk 170 and support ring members of this embodiment, as previously discussed are substantially identical to rotor disk 17 with exceptions comprising that this form of the present invention includes a plurality of cooling apertures through the center hub member 200, and does not include the integral drop rails 37.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A rotor that is subjected to a centrifugal force upon rotation, comprising:

an airfoil;

a member for carrying said airfoil;

a support ring coupled to said member for resisting the centrifugal force applied to the rotor, said support ring substantially elongated in a radial direction; and said member made of a different material than said ring and coupling said airfoil to said ring at a location to compressively transmit the majority of the centrifugal force to a radially inward location on said ring.

2. The rotor of claim 1, wherein said ring has a base and wherein said member transmits the majority of the centrifugal force to said base.

3. The rotor of claim 2, wherein said ring is formed of a high specific strength material system, and wherein said support ring has radial length at least twice it's axial width.

4. The rotor of claim 3, wherein said ring is formed of a metal matrix composite.

5. The rotor of claim 4, wherein said ring comprises silicon carbide fibers and titanium alloy.

6. The rotor of claim 5, wherein said member is a unitary substantially annular disk.

7. The rotor of claim 6, wherein said member further includes an axially extending flange for transmitting the majority of the centrifugal force to said support ring.

8. The rotor of claim 7, wherein at least a majority of said ring is axially spaced from said member.

9. The rotor of claim 8, which further includes a second support ring coupled to said member, said second support ring substantially elongated in a radial direction.

10. The rotor of claim 9, wherein said rings are located fore and aft said member.

11. The rotor of claim 10, wherein said second ring is formed of a metal matrix composite.

12. The rotor of claim 11, wherein said rings share the centrifugal force transmitted through the member.

13. The rotor of claim 12, wherein each of said rings further include an axially extending locating portion that abuts said member for spacing said rings from said member.

14. The rotor of claim 13, wherein said member has a plurality of cooling apertures formed therethrough to allow the passage of cooling fluid.

15. The rotor of claim 14, wherein said member is formed of a nickel alloy.

16. The rotor of claim 14, wherein said member is formed of a titanium alloy.

17. The rotor of claim 1, which further includes a second support ring coupled to said member, said second support ring substantially elongated in a radial direction and wherein said support rings contact said member only at a radially outward location distant from said radially inward location.

18. The rotor of claim 17, wherein said rings are located fore and aft said member.

19. The rotor of claim 18, wherein said rings are formed of a metal matrix composite, and wherein said member is formed of a nickel alloy.

20. The rotor of claim 18, wherein said rings are formed of a metal matrix composite, and wherein said member is formed of a titanium alloy.

21. A rotor that is subjected to a centrifugal force upon rotation, comprising:

an airfoil;

a member for carrying said airfoil;

a support ring coupled to said member for resisting the centrifugal force applied to the rotor, said support ring bearing on said member only at a radial outward location distant from a radially inward side of the support ring; and said member for transmitting the centrifugal force to the radially inward side of said support ring.

22. The rotor of claim 21, wherein said member and said ring are formed of different materials.

23. The rotor of claim 22, wherein said ring is formed of a composite material.

24. The rotor of claim 23, wherein said ring is formed of a metal matrix composite.

25. The rotor of claim 24, wherein at least a majority of said ring is axially spaced from said member.

26. The rotor of claim 25, which further includes a second ring, said second ring formed of a metal matrix composite and at least a majority of said second ring being axially spaced from said member.

27. The rotor of claim 26, wherein one of said rings is positioned fore said member and the other of said rings is positioned aft said member.

28. The rotor of claim 27, wherein said member is of a titanium alloy.

29. The rotor of claim 27, wherein said member is of a nickel alloy.

30. A rotor, comprising:

an airfoil;

a member for carrying said airfoil of a first material; and a pair of support rings of a second material positioned adjacent and coupled to said member, one of said support rings being positioned fore said member and the other being positioned aft said member, each of said support rings substantially elongated in a radial direction.

31. The rotor of claim 30, wherein said member is positioned substantially central between said pair of rings.

32. The rotor of claim 31, wherein said rings are made of a high specific strength material system.

33. The rotor of claim 32, wherein said member is a substantially annular disk having a rim portion with an axial width about at least as large as the axial width of said airfoil and a base portion, said rim portion being connected to said base portion by a radially extending web portion.

34. The rotor of claim 33, wherein said base portion has an axial width less than the axial width of said rim portion.

35. The rotor of claim 34, which further includes a pair drive hubs for connecting said rings to said member.

36. The rotor of claim 35, wherein said drive hubs define a L-shaped member for receiving the rings thereon, said L-shaped member having a flange portion parallel to an axial centerline of the rotor.

37. The rotor of claim 36, wherein said L-shaped member is annular.

38. The rotor of claim 37, wherein the drive hubs further include an upstanding circumferential shoulder for preventing the axial movement of said rings.

39. In combination:

a gas turbine engine; and a rotor positioned within said gas turbine engine that is subjected to a centrifugal force upon rotation, comprising:

an airfoil;

a member for carrying said airfoil;

a substantially radically elongated support ring coupled to said member for resisting the centrifugal force applied to the rotor; and said member of a different material than said ring and coupling said airfoil to said ring to transmit the centrifugal force to a radially inward location on said ring.

40. The combination of claim 39, which further includes a second substantially elongated support ring coupled to said member.

41. The combination of claim 40, wherein said rings are of a high specific strength material system, and wherein each of said rings having a radial length at least twice as large as it's axial width.

42. The combination of claim 41, which further includes at least one interstage spacer for connecting multiple rotors together.

43. The combination of claim 42, wherein a portion of said interstage spacer for transmitting the centrifugal force to a radially inward location on one of said rings.

44. The combination of claim 43, wherein said interstage spacer is coupled to said member by a bolted connection.

45. A rotor, comprising:

a center hub member of a first material, said center hub member having a rim portion and a radially inward base portion with a web portion extending therebetween;

said base portion including a pair of annular flanges extending axially from said center hub member;

a plurality of airfoils coupled to said rim portion and extending radially outward therefrom;

a pair of drive hub members coupled to said center hub member, one of said drive hub members positioned fore said center hub member and contacting one of said flanges and the other of said drive hub members positioned aft said center hub member and contacting the other of said flanges;

a pair of support rings of a second material for resisting a centrifugal force acting on the rotor, said support rings being substantially elongated in the radial direction and being positioned fore and aft said web portion for receiving the centrifugal force compressively transmitted from said pair of flanges.

46. The rotor of claim 45, which further includes a pair of rails extending radially inward from said rim for minimizing fluid recirculation loses, and wherein each of said pair of support rings having a radial length at least twice as large as it's axial width.

47. The rotor of claim 46, wherein said rings include a seal land extending axially therefrom.

48. The rotor of claim 47, wherein said rings spaced from said center hub member.

49. The rotor of claim 48, wherein said rings of a composite material and said center hub member of a nickel alloy.

50. The rotor of claim 48 wherein said rings of a composite material and said center hub member of a titanium alloy, and wherein each of said pair of support rings contacting said center member only at a radially outward location distant from a radially inward side of the support rings.

* * * * *

UNITED STATES PATENT AND TRADEMARK OFFICE
CERTIFICATE OF CORRECTION

PATENT NO. : 5,660,526
DATED : August 26, 1997
INVENTOR(S) : Robert A. Ress, Jr.

It is certified that error appears in the above-identified patent and that said Letters Patent is hereby corrected as shown below:

In col. 5, line 58, please delete "the", second occurrence.

In col. 7, line 14, please insert --a-- after "has".

In col. 7, line 14, please change "it's" to --its--.

In col. 8, line 41, please insert --of-- before "drive".

In col. 8, line 59, please change "radically" to --radially--.

In col. 9, line 4, please change "it's" to --its--.

In col. 10, line 10, please change "loses" to --losses--.

In col. 10, line 12, please change "it's" to --its--.

In col. 10, line 15, please insert after "wherein", --at least a majority of--.

Signed and Sealed this

Sixteenth Day of December, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,660,526
DATED : August 26, 1997
INVENTOR(S) : Robert A. Ress, Jr. et al.

It is certified that error appears in the above-identified patent and that said Letters Patent is hereby corrected as shown below:

Column 1, line 6, please insert the following:

-- This invention was made with Government support under Contract No. F33615-92-C-2268 awarded by the United States Air Force. The Government has certain rights in this invention.--

Signed and Sealed this

First Day of June, 1999

Attest:

Q. TODD DICKINSON

Attesting Officer

Acting Commissioner of Patents and Trademarks